United States Patent [19]

Matsumoto et al.

[11] Patent Number: 4,985,890
[45] Date of Patent: Jan. 15, 1991

[54] DATA TRANSMISSION UNIT

[75] Inventors: Satoshi Matsumoto, Nara; Daisuke Azuma, Tenri; Souichi Miyata, Nara, all of Japan

[73] Assignee: Sharp Kabushiki Kaisha, Osaka, Japan

[21] Appl. No.: 260,068

[22] Filed: Oct. 20, 1988

[30] Foreign Application Priority Data

| Oct. 20, 1987 | [JP] | Japan | 62-265738 |
| Oct. 20, 1987 | [JP] | Japan | 62-265739 |
| Oct. 20, 1987 | [JP] | Japan | 62-265742 |
| Jan. 22, 1988 | [JP] | Japan | 63-12783 |
| Jan. 22, 1988 | [JP] | Japan | 63-12784 |
| Jan. 22, 1988 | [JP] | Japan | 63-12785 |
| Mar. 17, 1988 | [JP] | Japan | 63-65514 |
| Mar. 17, 1988 | [JP] | Japan | 63-65515 |

[51] Int. Cl.$^5$ ............................ H04J 3/24; H04J 3/02
[52] U.S. Cl. .............................. 370/94.1; 370/85.6; 340/825.5
[58] Field of Search ................ 370/85.2, 85.6, 94.1, 370/60, 85.1, 85.15; 340/825.5, 525.51

[56] References Cited

U.S. PATENT DOCUMENTS

| 4,677,616 | 6/1987 | Franklin | 370/94.1 |
| 4,771,391 | 9/1988 | Blasbalg | 370/94.1 |
| 4,779,267 | 10/1988 | Limb | 370/94.1 |

Primary Examiner—Douglas W. Olms
Assistant Examiner—Wellington Chin

[57] ABSTRACT

Two input-side data transmission paths are provided in parallel with each other, and a competition detecting part detects the time difference between times of arrival of transmission signals supplied to the respective data transmission paths for stopping the data arriving with a delay on the data transmission path therefor if the time difference is within a constant range. Thereby, the time difference is rendered to be outside of the constant range. A word number counting part counts the word numbers of the data transmitted to the data transmission paths, and an arbitration control part supplies transmission authorizing signals to the respective input-side data transmission paths for transmitting the data of the counted word numbers to an output-side data transmission path. The two input-side data transmission paths are provided with buffer mechanisms for changing the amounts of data delay in response to the degree of data occupancy.

14 Claims, 14 Drawing Sheets

DATA TRANSMISSION UNIT

BACKGROUND OF THE INVENTION

1. Field of the Invention

The present invention relates to a data transmission unit. More specifically, it relates to a data transmission unit for transmitting data sent in over a plurality of transmission paths at random time intervals to a single transmission path through autonomously arbitration.

2. Description of the Related Art

In processing equipment such as an electronic computer, a plurality of processing units are communicatively coupled by digital signals, to perform data processing In general, contents of data processed in a distributed manner are varied with the processing units, while data required for such processing and results obtained in the respective processing units are different from each other. When interconnection is performed for each data processing required for data transfer with an input/output port in order to couple such a plurality of processing units, the hardware for the equipment is extremely complicated and the size and cost of the entire apparatus is increased.

The inventors have proposed a data transmission unit for transmitting different types of data groups through the same data transmission path as disclosed in Japanese Patent Laying-Open Gazette No. 174857/1987.

FIG. 1 is a block diagram schematically showing illustrating the data transmission unit proposed by the inventors.

Referring to FIG. 1, a brief description is now made for the data transmission unit, which branches data to two transmission paths for transmitting data. Each of the data transmission paths 1, 7 and 8 in FIG. 1 is formed by a data register for transmitting data and a transfer control part. An identifier transmission path 2 is provided in parallel with the data transmission path 1. The identifier transmission path 2 is adapted to transmit an identifier called a tag. This identifier indicates whether the data received on the data transmission path 1 is to be transmitted to the data transmission path 7 or the other path 8.

When both of the data transmission paths 7 and 8 are empty for enabling data transmission subsequent data transmission paths (not shown) supply UK signals 5a and 6a to control parts 5 and 6 respectively. Similarly, UL signals 5d and 6d from preceding stages of the data transmission paths 7 and 8 are also supplied to the control parts 5 and 6 respectively. The UL signals 5d and 6d are supplied from arbitrary data transmission paths which precede the data transmission paths 7 and 8, for indicating that the data transmission paths 7 and 8 are empty for enabling data transmission. Upon inputting the UK signal 5a, the UL signal 5d, the UK signal 6a and the UL signal 6d, the control parts 5 and 6 determine that the data transmission path 7, the preceding the path, the data transmission path 8 and the preceding path are empty respectively, for transmitting data, which may be theretofore held, to subsequent stages, and active states for enabling branch control of subsequent input data may be entered.

A NOR gate 4 receives the signals 5b and 6b from the control parts 5 and 6 indicating that the control parts are empty and activated, for supplying an AK signal to the data transmission path 1 and the identifier transmission path 2. Thus, data transmission from the control parts 5 and 6 to the data transmission paths 7 and 8 is permitted or inhibited while branching/transmission of data from the data transmission path 1 to the control part 5 and 6 is permitted or inhibited by the UK and UL signals from the data transmission paths 7 and 8 and the preceding same, depending on whether or not the preceding transmission paths are empty.

The identifier transmission path 2 supplies an identifier decoding part 3 with an identifier, which shows that the data received on the data transmission path 1 is to be transmitted to the data transmission path 7, for example. The identifier decoding part 3 decodes the identifier received from the identifier transmission path 2 and supplies a control signal 5c to the control part 5 for activating the control part 5. Thus, the data received from the data transmission path 1 can be transmitted to the data transmission path 7 through the control part 5. On the other hand, when the identifier transmission path 2 supplies the decoding part 3 with an identifier indicating that the data is to be transmitted to the data transmission path 8, the identifier decoding part 3 supplies a control signal 6c to the control part 6 for activating the control part 6. Thus, the data received on the data transmission path 1 can be transmitted to the data transmission path 8 through the control part 6.

Within the data transmission paths 7 and 8 and the preceding paths, when the data transmission path 7 currently holds or transmits data, for example, no UK signal 5a is supplied to the control part 5. Also, when the transmission path preceding the data transmission path 7 currently holds or transmits data, no UL signal 5d is supplied to the control part 5. Thus, the control part 5 determines that the data transmission path 7 or the preceding path is currently in transmission or in a busy condition, for storing data inputted in a register (not shown) included in a control part 10 while supplying a high-level signal to one input terminal cf the NOR gate 4. Thus, the NOR gate 4 is closed so that nc AK signal is supplied to the data transmission path 1 and the identifier transmission path 2.

In other words, when any of the data transmission paths 7 and 8 and the preceding paths currently hold or transmit data while the control parts 5 and 6 hold data, data received on the data transmission path 1 is not inputted in the control parts 5 and 6 but data is held in the data transmission path 1. When the data transmission path 7, the preceding path, the data transmission path 8 or the preceding path completes data transmission to cause a transition from a busy condition to an empty state, the control part 5 or 6 is activated. Thus, the data held in the data transmission path 1 can be autonomously branched again in accordance with the identifier.

In the aforementioned data transmission unit, the time required for processing distributed data is varied with the received data and the processing contents required for the unit, while data groups are not necessarily transmitted regularly in the same order at the same time intervals, as a result of the processing. If the transmission paths themselves can be provided with a buffer function for minimizing quantities of transmission data groups held up due to dispersion in the processing, hardware of the processing unit can be reduced.

SUMMARY OF THE INVENTION

A principal object of the present invention is to provide a data transmission unit which can receive data through a plurality of parallel input-side transmission paths and limit the receiving ability of the transmission paths, for transmitting the same data in order to efficiently receive external data and transferring the data for internal processing when dispersed data is to be collected by a single computer.

Another object of the present invention is to provide a data transmission unit which can transmit data to an output-side transmission path in the order of data arrival, while arbitrating data transmission to the output-side transmission path if the data are held up in a plurality of input-side transmission paths.

Still another object of the present invention is to provide a data transmission unit which can transmit data in units of arbitrary word numbers if the data are held up in input-side transmission paths.

A further object of the present invention is to provide a data transmission unit which can adjust competition between a plurality of data by counting the time difference between data arriving at respective input-side transmission paths and stopping the delayed data in the transmission path therefor if the time difference is within a constant range, to make the time difference out of the constant range.

Briefly stated, first and second input-side transmission paths are provided in parallel with each other, for transmitting data in response to the supply of transmission authorizing signals respectively. In response to the supply of a transmission authorizing signal from an output-side transmission path upon the presence of data in the first and second transmission paths, arbitration control means outputs a transmission authorizing signal to the first or second input-side transmission path in compliance with the degree of data occupancy of the first and second input-side transmission paths.

Thus, according to the present invention, data transmitted to the output-side transmission path can be arbitrated in response to the degree of data occupancy in the first and second input-side transmission paths. Thereby, the data can be received up to the limit of receiving ability of the transmission paths, which is subjected to transmission In a preferred embodiment of the present invention, the first and second input-side transmission paths are formed by input-side data hold means for holding inputted data and input-side transfer control means for transferring the data held in the input-side data hold means in response to supplying a command pulse signal from a subsequent transmission path and supplying the transmission authorizing signal.

The output-side transmission path is formed by output-side data hold means for holding the data received from the first or second input-side transmission path and output-side transfer control means for transferring the data held in the output-side data hold means to a preceding transmission path in response to supplying a transmission authorizing signal from the preceding transmission path.

As hereinabove described, each transmission path is formed by data hold means and transfer control means. Thereby, the data can be asynchronously transmitted in a handshaking manner.

In a more preferred embodiment, word numbers of data transmitted to the first and second input-side transmission paths are counted and pulse packet-unit signals are outputted in response to counting of data of predetermined word numbers. Thereby, the data of the predetermined word numbers are transmitted in response to, the pulse signals.

Therefore, even if the data are held up in the input-side transmission paths, the data in units of arbitrary word numbers can be transmitted In a more preferred embodiment of the present invention, determinations are made as to whether or not data are present in the first and second input-side transmission paths respectively and whether or not the time difference between arrival time of the data is within a range of predetermined constant time difference. As a result, the delayed data in the first or second input-side transmission path may be stopped until the time difference is out of the range if the latter determination is positive.

Thus, even if the data arriving at the first and second transmission paths are in competition with each other, the earlier data can be first transmitted to the output-side transmission path. Thereby, the competition of the data is adjusted.

In a more preferred embodiment of the present invention, buffer means is connected to respective input sides of the first and second input-side transmission paths for changing the amounts of the data delay transferred through the buffer means in response to the degree of data occupancy.

Thus, the amounts of the data delay are changed in response to the degree of data occupancy. Thereby, the data can be received to the limit of the receiving ability of the buffer means, to be subjected to transmission.

BRIEF DESCRIPTION OF THE DRAWINGS

These and other objects, features, aspects and advantages of the present invention will become more apparent from the following detailed description of the present invention when taken in conjunction with the accompanying drawings and wherein.

DESCRIPTION OF THE PREFERRED EMBODIMENTS

Figure 1:
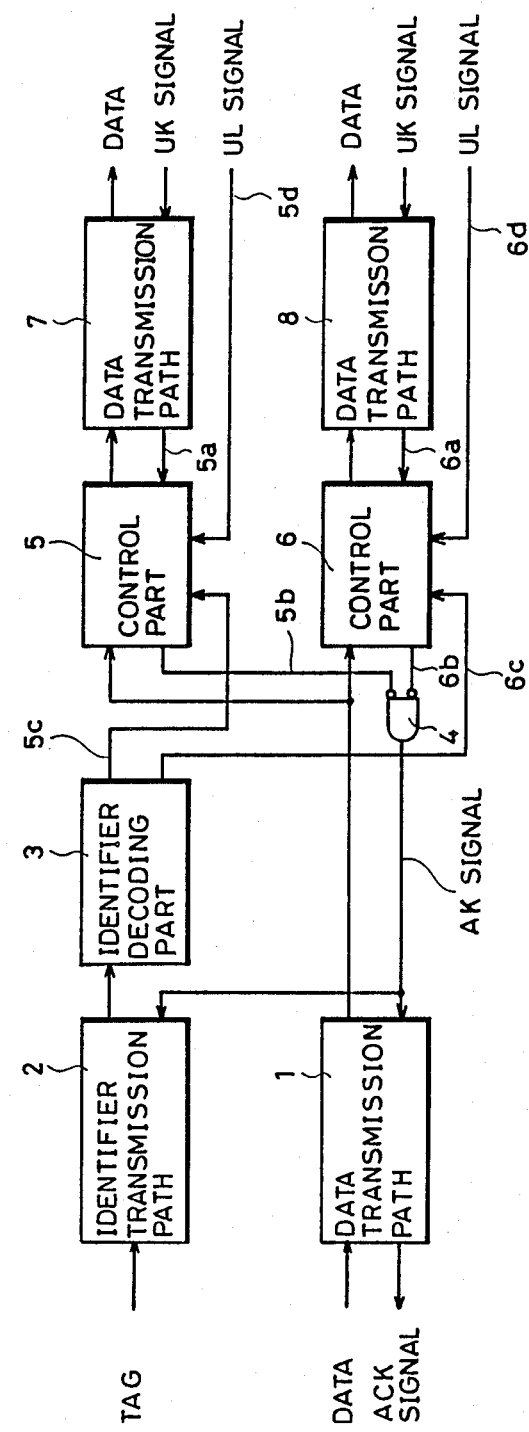
FIG. 1 is a schematic block diagram illustrating a conventional data transmission unit.
Figure 2:
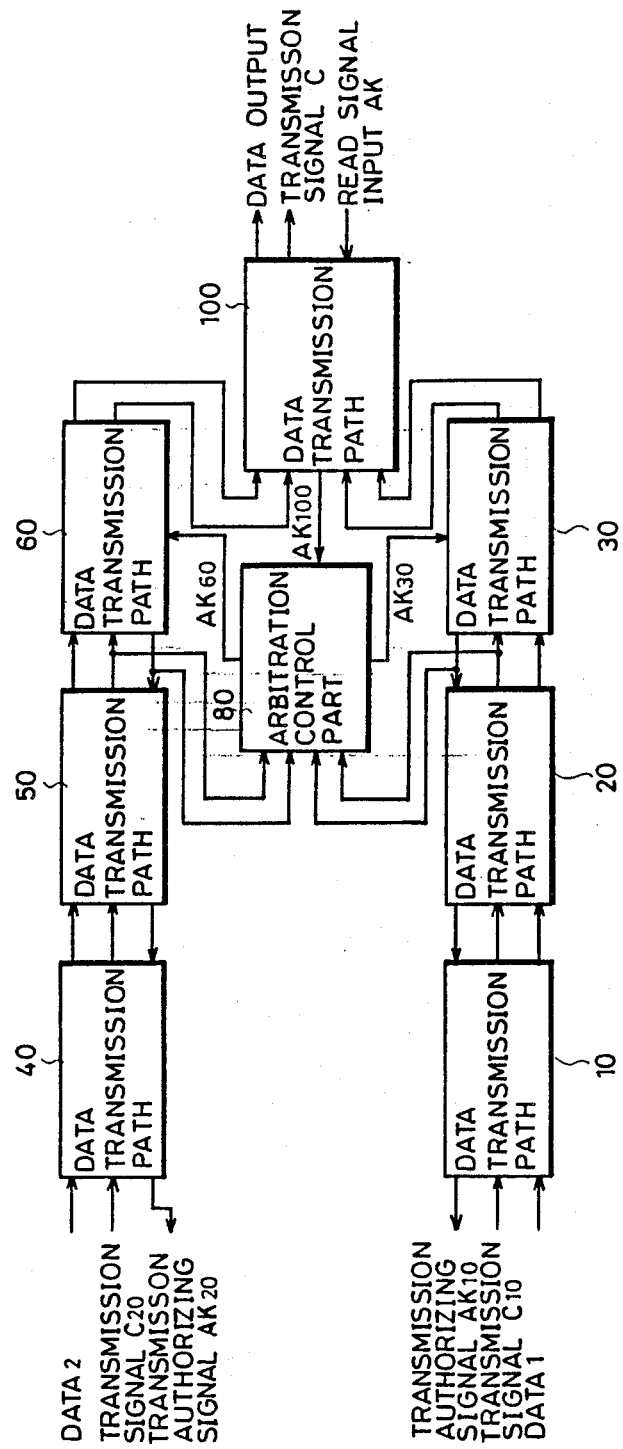
FIG. 2 is a schematic block diagram illustrating an embodiment of the present invention.

FIG. 2 is a schematic block diagram illustrating an embodiment of the present invention. The structure of the present embodiment is now described will be described as follows with reference to FIG. 2.

Data transmission paths 10, 20 and 30 are connected in series with each other to form a first input-side data transmission path group, while data transmission paths 40, 50 and 60 are connected in series with each other to form a second data transmission path group in parallel with the data transmission paths 10, 20 and 30. Packet-unit data 1 and a transmission signal C10 are sequentially supplied to the data transmission paths 10, 20 and 30, while packet-unit data 2 and a transmission signal C20 are sequentially supplied to the data transmission paths 40, 50 and 60. An arbitration control part 80 receives a transmission authorizing signal AK100 from a data transmission path 100, which is an output-side transmission path, for arbitrating the output order in response to the degree of data occupancy of the parallel input-side transmission path groups. Thereby, the data is outputted to the data transmission path 100.

A description follows for the operation of the data transmission unit illustrated in FIG. 2. In an initial state, the output-side data transmission path 100 is capable of data receiving, and the transmission authorizing signal AK100 returns to the arbitration control part 80. The arbitration control part 80 receives the transmission authorizing signal AK100 from the output-side data transmission path 100, for outputting the transmission authorizing signals AK30 and AK60 to the data transmission paths 30 and 60. The transmission authorizing signals AK30 and AK60 are not adapted for simultaneously authorizing transmission to the data transmission path 100, but either the former or the latter signal is adapted to authorize such transmission.

Consider that the data transmission path 30 is authorized to transmit data while the data transmission path 60 is inhibited from data transmission in this embodiment, for example. The data 1 arriving at the data transmission path 10 is transmitted to the data transmission path 30 through the data transmission path 20 with the transmission signal C10, which is also transmitted to the arbitration control part 80. The arbitration control part 80 confirms that no data is transferred to the data transmission path 60, for supplying the transmission authorizing signal AK30 to the data transmission path 30, in order to authorize data transmission to the data transmission path 100. Furthermore, the arbitration control part 80 does not supply the transmission authorizing signal AK60 to the data transmission path 60, to inhibit the data transmission path 60 from data transmission to the data transmission path 100.

Thus, the data transmission path 30 is authorized to transmit data to the data transmission path 100. Upon passage of the data through the data transmission path 100, the transmission authorizing signal AK30 returns to the data transmission path 30 from the data transmission path 100 through the arbitration control part 80, for inhibiting the data transmission path 30 from data transmission while authorizing the other data transmission path 60 to transmit data.

Data arriving at the data transmission path 40 is transmitted to the data transmission path 60 through the data transmission path 50 with the transmission signal C20, which is also transmitted to the arbitration control part 80. The arbitration control part 80 confirms that no data is present in the data transmission path 30, and the transmission authorizing signal AK60 is supplied to the data transmission path 60 in order to authorize data transmission to the data transmission path 100, while the transmission authorizing signal AK30 is not supplied to the data transmission path 30. Thus, the data transmission path 30 is inhibited from data transmission to the data transmission path 100. In response to such authorization, the data transmission path 60 transmits the data to the data transmission path 100 Upon passage of the data through the data transmission path 100, the transmission authorizing signal AK30 returns to the data transmission path 60 from the data transmission path 100 through the arbitration control part 80, for inhibiting the data transmission path 30 from data transmission.

A description follows for the case when the data 2 is inputted in a slight delay to the data 1. Upon arrival of the data 1 at the data transmission path 10, the transmission signal C10 therefor is transmitted to the data transmission path 30 through the data transmission path 20, as well as to the arbitration control part 80. The arbitration control part 80 inhibits the data transmitting data 60 from data transmission to the data transmission path 100. Then, the data 2 arrives at the data transmission path 40 and is temporarily stopped in the data transmission path 60 through the data transmission path 50. When the data 1 passes through the data transmission path 30, the data transmission path 60 is authorized to transmit the data 2 to the data transmission path 100. Thus, the arbitration control part 80 temporarily stops the delayed data of the data 1 and 2 in the data transmission path 30 or 60, and arbitrates the order of data transmission.

Figure 3:
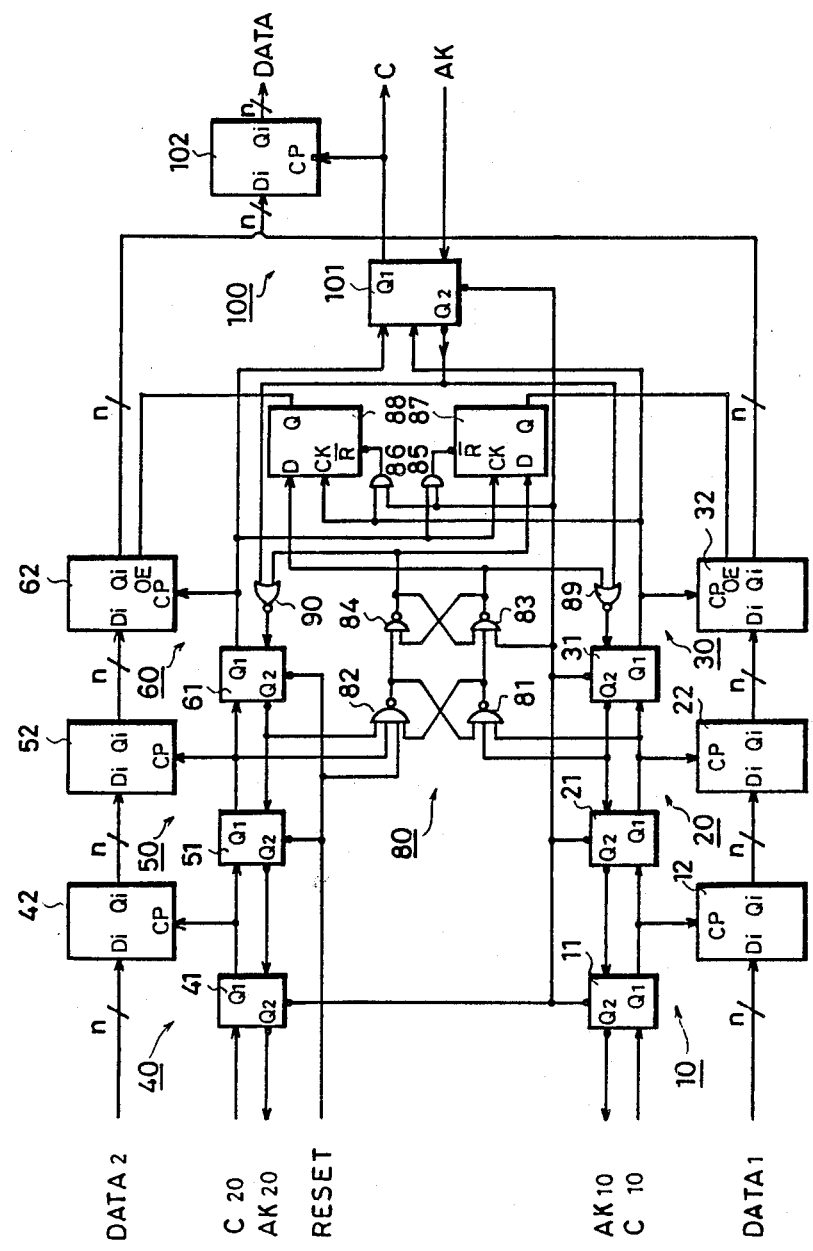
FIG. 3 is a more detailed block diagram of the embodiment illustrated in FIG. 2.

FIG. 3 is a detailed block diagram of the embodiment illustrated in FIG. 2. Referring to FIG. 3, a structure for the present embodiment of the data transmission unit is described as follows. The data transmission paths 10, 20 and 30 illustrated in FIG. 2 are formed by transfer control parts 11, 21 and 31 and data hold devices 12, 22 and 32 respectively. Similarly, the data transmission paths 40, 50 and 60 are formed by transfer control parts 41, 51 and 61 and data hold devices 42, 52 and 62. The transfer control parts 11, 21 and 31 perform handshaking transfer control by inputting one transmission signal C10, and one transmission authorizing signal, and outputting one transmission signal and one transmission authorizing signal AK10. Similarly, the transfer control parts 41, 51 and 61 perform handshaking transfer control by inputting one transmission signal C20, and one transmission authorizing signal, and outputting one transmission signal and one transmission authorizing signal AK10.

The output-side data transmission path 100 is formed by a transfer control part 101 and a data hold device 102. The transfer control part 101 has a function for obtaining the logical sum of two different transmission signals, and performs handshaking control in a similar manner to the transfer control parts 11, 31, 41 and 61.

The arbitration control part 80 is formed by NAND gates 81 and 82 which define a preceding flip-flop NAND gates 83 and 84 which define a subsequent flip-flop D-type flip-flops 87 and 88, AND gates 85 and 86, and NOR gates 89 and 90.

Figure 4:
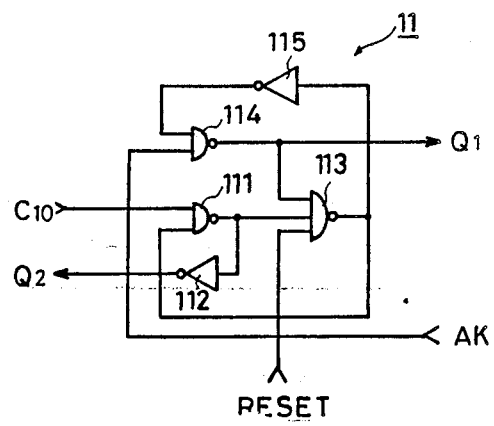
FIG. 4 is a more detailed block diagram of an input-side transfer control part illustrated in FIG. 3.
Figure 5:
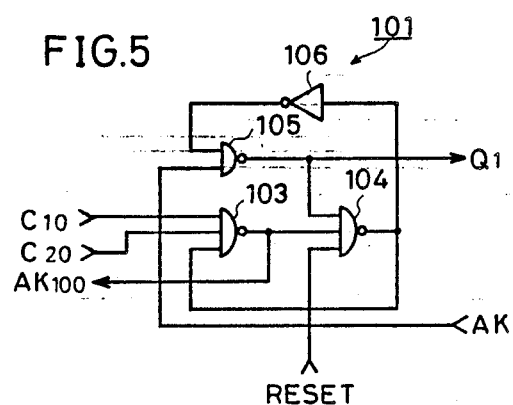
FIG. 5 is a more detailed block diagram of an output-side transfer control part shown in FIG. 3.

FIG. 4 is a detailed block diagram of the transfer control part 11 illustrated in FIG. 3, and FIG. 5 is a detailed block diagram of the transfer control part 101.

As illustrated in FIG. 4, the transfer control part 11 is formed by two-input NAND gates 111 and 114, inverters 112 and 115 and a three-input NAND gate 113. The NAND gate 111 receives the transmission signal C10 at one input and the inverter 112 outputs the transmission authorizing signal AK10 from an output $Q_2$, while the NAND gate 114 outputs a transmission signal $Q_1$ and the NAND gate 114 receives a transmission authorizing signal AK at one input. The remaining transfer control parts 21, 31, 41, 51 and 61 are structured similarly to the transfer control part 11.

As illustrated in FIG. 5, the transfer control part 101 is formed by three-input NAND gates 103 and 104, a two-input NAND gate 105 and an inverter 106. The NAND gate 103 receives the transmission signals C10 and C20 from the first and second data transmission path groups for outputting a transmission authorizing signal AK100, while the NAND gate 105 receives the transmission authorizing signal AK at one input and outputs the transmission signal $Q_1$.

With reference to FIG. 3, a more detailed description for the operation of the data transmission unit of the present invention. In an initial state, reset signals are supplied to the transfer control parts 11, 21, 31, 41, 51, 61 and 101, the AND gates 85 and 86 and the NAND gates 82 and 83. Thus, the transfer control parts 11, 21, 31, 41, 51 and 61 are initially reset respectively, whereby the $Q_1$ as well as the $Q_2$ outputs thereof are at high levels respectively.

When the transfer control part 101 is reset, the $Q_1$ output goes to a high level while the $Q_2$ output goes to a low level. The output of the NAND gate 82 goes to a high level in response to the reset signal, so that the high-level signal is supplied to the NAND gate 81, which forms the preceding flip-flop. All of the other inputs to the NAND gate 81 enter high levels since the transfer control parts 21, 31, 51 and 61 are reset, while the output of the NAND gate 81 is at a low level for stabilizing the preceding flip-flop formed by the NAND gates 81 and 82.

The subsequent flip-flop formed by the NAND gates 83 and 84 receives the output from the preceding flip-flop, while the output of the NAND gate 83 is at a high level and the output of the NAND gate 84 is at a low level since the NAND gate 83 receives the reset signal. Thereby, the subsequent flip-flop is also stabilized. The output from the NAND gate 83 is supplied to the input of the NOR gate 89, the output of the NOR gate 89 to a low level for inhibiting data transmission to the data transmission path 100. The output of the NAND gate 84 is supplied to the input of the NOR gate 90 the output of the NOR gate 90 goes to a high level for enabling data transmission to the data transmission path 100.

When the data 1 is supplied to the data hold device 12 and the transmission signal C10 is supplied to the transfer control part 11 in this state, the $Q_1$ output of the transfer control part 11 goes to a low level since the $Q_2$ output of the transfer control part 21 is at a high level; whereby the $Q_1$ output of the transfer control part 11 is transmitted to the transfer control part 21 and serves as a clock pulse of the data hold device 12, so that the contents of the data 1 is outputted to $Q_i$ of the data hold device 12. The $Q_1$ output of the transfer control part 21 goes to a low level since the $Q_2$ output of the transfer control part 31 is at a high level. Thereby, the $Q_1$ output of the transfer control part 21 is transmitted to the transfer control part 31 and serves as a clock pulse of the data hold device 22, so that the contents of Qi of the data hold device 12 is outputted to Qi of the data hold device 22.

The $Q_1$ output and the $Q_2$ output of the transfer control part 21 are inputted in the NAND gate 81, and the output of the NAND gate 81 is converted from a low level into a high level. This output of the NAND gate 81 is inputted to the NAND gates 82 and 83. The output of the NAND gate 82 goes to a low level since all of the inputs to the NAND GATE 82 are at high levels, for stabilizing the preceding flip-flop. The output of the NAND gate 84 is converted from a low level into a high level, and is inputted to the NAND gate 83. The output of the NAND gate 83 goes to a low level since the input is at a high level for stabilizing the subsequent flip-flop.

The low-level signal outputted from the NAND gate 83 is inputted to the NOR gate 89, and a transmission authorizing signal outputted from the output $Q_2$ of the transfer control part 101 is activated. Thereby, the $Q_1$ output of the transfer control part 31 goes to a low level. When the the transmission authorizing signal AK transmitted to the transfer control part 101 is at a high level, the $Q_1$ output of the transfer control part 101 goes to a low level and serves as a clock pulse of the data hold device 102, thereby the contents of Di of the data hold device 102 is outputted to Qi.

During an output interval from the transfer control part 31 to the transfer control part 101, the high-level signal outputted from the NAND gate 84 is held as the output from the subsequent flip-flop and inputted to the NOR gate 90. Thereby, the output of the NOR gate 90 is held at a low level for inhibiting an output from the transfer control part 61 to the transfer control part 101. Furthermore, the output of the D-type flip-flop 88 is converted to a low level in response to the output of the transfer control part 31. Thereby, the output Qi of the data hold device 62 is rendered to be at high impedance, and does not collide with the Qi output of the data hold device 32.

When the data 2 is supplied to the data hold device 42 and the transmission signal C20 is supplied to the transfer control part 41, an operation is performed in a similar manner to the aforementioned operation following input of the data 1.

A description follows for a case when the data 2 is inputted with a constant time difference from the data 1 after the initial state. After the data 1 is supplied to the data hold device 12 and the transmission signal C10 is supplied to the transfer control part 11, the data 2 inputted within a slight delay is supplied to the data hold device 42 and the transmission signal C20 is supplied to the transfer control part 41. The transmission signal C10 is supplied to the transfer control part 31 through the transfer control parts 11 and 21 and is inputted to the NAND gate 81. The output of the NAND gate 81 is converted from a low level into a high level for stabilizing the flip-flop formed by the NAND gates 81 and 82.

The output of the NAND gate 82 is inputted to the NAND gate 84, and the output of the NAND gate 84 is converted from a low level to a high level, for stabilizing the flip-flop formed by the NAND gates 83 and 84. The output of the NAND gate 83 is supplied to the NOR gate 89 for authorizing data transmission from the transfer control part 31 to the transfer control part 101. At this time, the output of the NAND gate 84 is supplied to the NOR gate 90 for inhibiting the transfer control part 61 from transmitting data. Data transmission of the transfer control part 61 is authorized after the transmission signal C10 is transmitted from the transfer control part 31 to the transfer control part 101.

When the data 1 is inputted with a slight delay to the data 2, a similar operation is performed.

When the data 1 and 2 are thus inputted in competition with each other, the data inputted with a delay is temporarily stopped by the flip-flops formed by the NAND gates 81, 82, 83 and 84.

According to this embodiment, as hereinabove described, the data 1 is sequentially outputted when no data 2 is present while the data 2 is sequentially outputted when no data 1 is present in an empty state of the output-side data transmission path 100. When the data 1 and 2 are transmitted with the maximum transfer ability of the data transmission paths, the data 1 and 2 are held up in the data transmission paths 30, 20, 10, 60, 50 and 40 since the data cannot be completely processed in the data transmission path 100. In this case, the data transmission paths 30 and 60 alternately transmit the data on the respective transmission paths to the data transmission path 100.

According to this embodiment, as hereinabove described, even if data are asynchronously transmitted from a plurality of parallel transmission paths at arbitrary time intervals, the arbitration control part 80 performs an arbitration in response to the transmission authorizing signal AK from the output-side data transmission path 100 for receiving the data which limits the physical receiving ability of the transmission paths, thereby, the data is sequentially transmitted to the output-side data transmission path 100 with no delay time required for such arbitration control. Thus, an arbitration mechanism having high-speed transmission ability can be implemented in high reliability.

Figure 6:
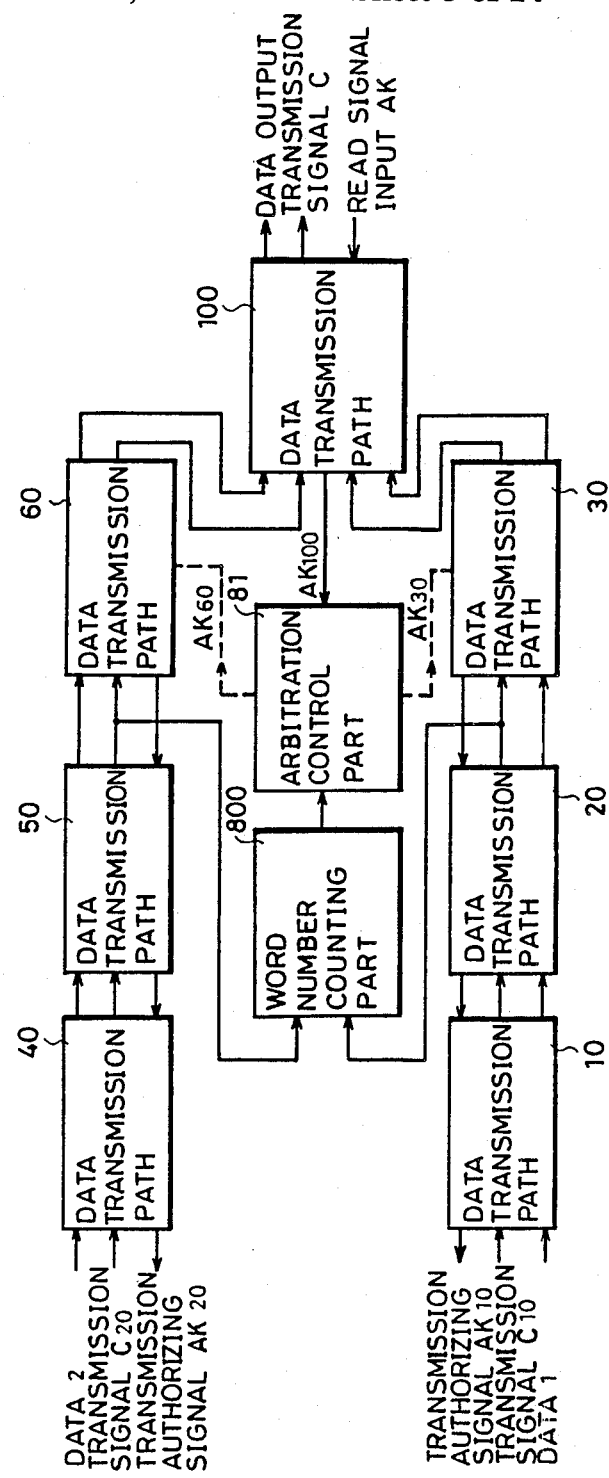
FIG. 6 is a schematic block diagram illustrating a data transmission unit provided with a word number counting part according to another embodiment of the present invention.

FIG. 6 is a schematic block diagram illustrating another embodiment of the present invention. The embodiment in FIG. 6 is provided with a word number counting part 800, in contrast to the embodiment in FIG. 2. The word number counting part 800 is adapted for counting the word number of the data passing through a data transmission path 20 or 50, generating a packet-unit pulse and supplying the data to an arbitration control part 81. In response to the packet-unit pulse outputted from the word number counting part 800 upon counting the number of the data passing through the data transmission path 20, the arbitration control part 81 supplies a transmission authorizing signal AK30 to a data transmission path 30 for authorizing data transmission from the data transmission path 20 to a data transmission path 100 through the data transmission path 30, while supplying no transmission authorizing signal AK60 to a data transmission path 60. In response to a packet-unit pulse outputted from the word number counting part 800 upon counting of the number of data passing through the data transmission path 50, on the other hand, the arbitration control part 81 supplies the transmission authorizing signal AK60 to the data transmission path 60 for authorizing data transmission from the data transmission path 50 to the data transmission path 100 through the data transmission path 60, while supplying no transmission authorizing signal AK30 to the data transmission path 30.

Figure 7:
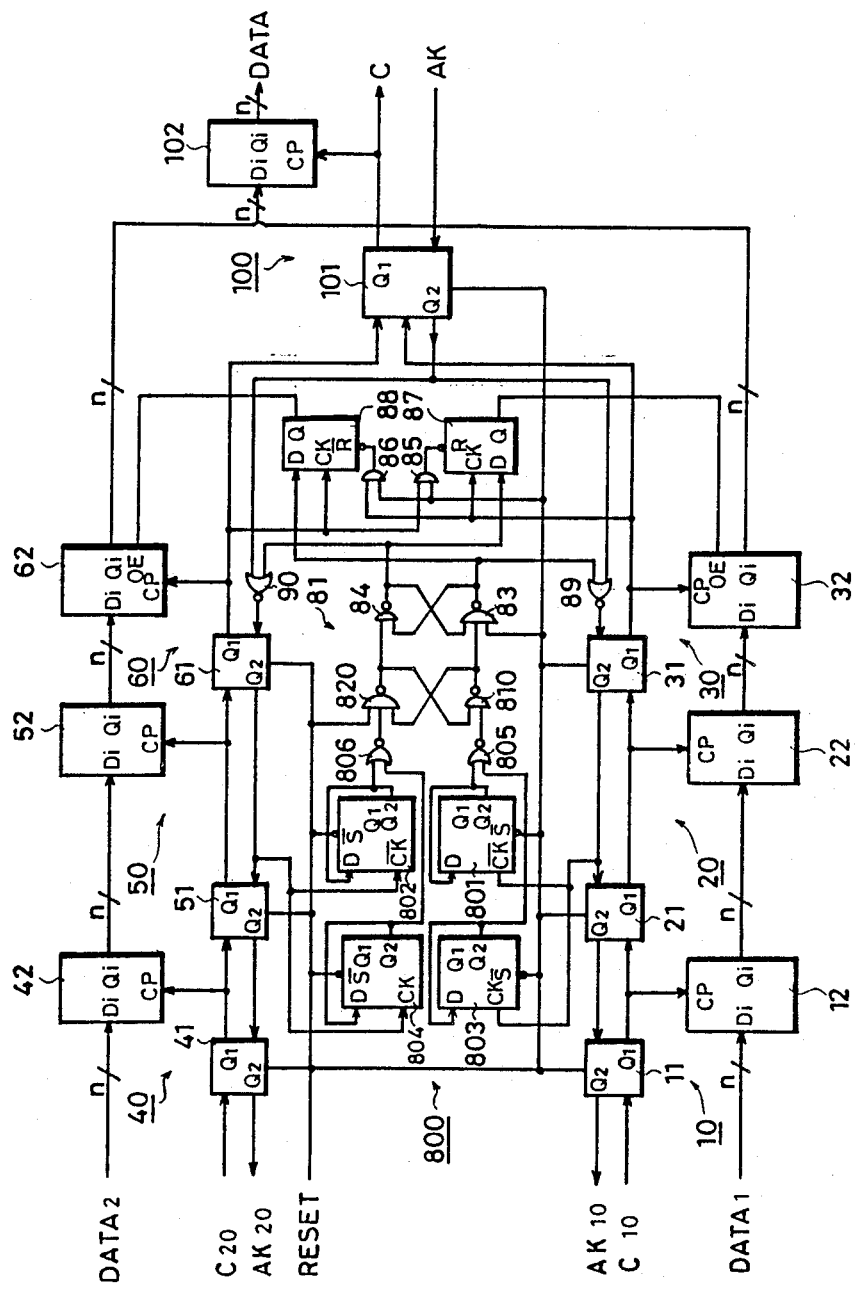
FIG. 7 is a more detailed block diagram of the embodiment illustrated in FIG. 6.

FIG. 7 is a more detailed block diagram of the embodiment in FIG. 6. The structure illustrated in FIG. 7 is similar to the structure of FIG. 3, except for the following differences: The word number counting part 800 is formed by D-type flip-flops 801, 802, 803 and 804 and NOR gates 805 and 806. The D-type flip-flops 801 and 802 are adapted for outputting the contents of D inputs ($Q_2 = \bar{Q}_1$) to $Q_1$ outputs on a trailing edge of a clock pulse. The D-type flip-flops 803 and 804 are adapted for outputting the contents of D inputs ($Q_2 = \bar{Q}_1$) to $Q_1$ outputs. $Q_2$ outputs of the respective D-type flip-flops 801 and 803 are supplied to one input end of a NAND gate 810 through the NOR gate 805. Respective $Q_2$ outputs of the D-type flip-flops 802 and 804 are supplied to another NAND gate 820 through the NOR gate 806. A preceding flip-flop is defined by the NAND gates 810 and 820.

A description for the on operation of the embodiment shown in FIG. 7. In an initial state, transfer control parts 11, 21, 31, 41, 51 and 61 are initially reset so that respective $Q_1$ outputs and $Q_2$ outputs thereof are at high levels. When a transfer control part 101 is initially reset, the $Q_2$ output goes to a high level while the $Q_2$ output goes to a low level. The D-type flip-flops 801, 802, 803 and 804 forming the word number counting part 800 are also reset by reset signals. Thereby, the respective $Q_1$ outputs thereof are at high levels while the $Q_2$ outputs thereof are at low levels. The Q outputs of the D-type flip-flops 87 and 88 are at low levels by reset signals. The output of the NAND gate 820 forming the preceding flip-flop goes to a high level in response to a reset signal, and is supplied to one input of the NAND gate 810. The other input end of the NAND gate 810 goes to a high level since both of the $Q_2$ outputs of the D-type flip-flops 801 and 803 are at low levels. Thus, the output of the NAND gate 810 goes to a low level for stabilizing the preceding flip-flop formed by the NAND gates 810 and 820.

A subsequent flip-flop formed by the NAND gates 83 and 84 receives the output from the preceding flip-flop, while the output of the NAND gate 83 goes to a high level and the output of the NAND gate 84 goes to a low level since a reset signal is inputted in the NAND gate 83. Thereby the subsequent flip-flop is also stabilized.

The output from the NAND gate 83 is supplied to the input of the NOR gate 89, and the output of the NOR gate 89 goes to a low level for inhibiting data transmission from the data transmission path 30 to the data transmission path 100. The output of the NAND gate 84 is supplied to the input of the NOR gate 90, and the output of the NOR gate 90 goes to a high level for enabling data transmission from the data transmission path 60 to the data transmission path 100.

When data 1 is supplied to data hold device 12 and a transmission signal C10 of a low level is supplied to the transfer control part 11 in this state, the $Q_1$ output of the transfer control part 11 is transmitted to the transfer control part 21 and the content of the data 1 is outputted to the Qi terminal of the data hold device 12 in a similar manner to the above description in FIG. 3. Furthermore, the $Q_1$ output of the transfer control part 21 is transmitted to the transfer control part 31 while the contents at the Qi terminal 100 and change means data hold device 12 is outputted to the Qi terminal of data hold device 22.

On the other hand, the D-type flip-flops 801 and 803 and the NOR gate 805 of the word number counting part 800 divide the $Q_2$ output of the transfer control part 31, to which is inputted the same into the NAND gate 810. The $Q_2$ output of the transfer control part 31 is thus arbitrarily divided for performing arbitration control of the packet-unit data of an arbitrary word number. The output of the NOR gate 805 is inputted in the NAND gate 810, and the output of the NAND gate 810 is converted from a low level into a high level, for being inputted to the NAND gates 82 and 83. All of the inputs to the NAND gate 82 are at high levels so that the output goes to a low level for stabilizing the preceding flip-flop.

Thus, the subsequent flip-flop is stabilized since the output of the NAND gate 84 goes to a high level and the output of the NAND gate 83 goes to a low level. The low-level signal outputted from the NAND gate 83 is supplied to the transfer control part 31 through the NOR gate 89. Since a transmission authorizing signal AK100 outputted from the transfer control part 101 is activated, the output $Q_1$ of the transfer control part 31 goes to a low level. When the transmission authorizing signal AK transmitted to the transfer control part 101 is at a high level, the $Q_1$ output of the transfer control part 101 goes to a low level while the contents at the Di terminal of the data hold device 102 is outputted to the Qi terminal.

When the transfer control part 31 outputs a transmission signal to the transfer control part 101, a high-level output of the NAND gate 84 is held while the output of the subsequent flip-flop is inputted in the NOR gate 90, and the transfer control part 61 is inhibited from outputting a transmission signal to the transfer control part 101. The output of the D-type flip-flop 88 is converted into a low level by the output from the transfer control part 21. Thereby, the output Qi of the data hold device 62 is rendered to be at high impedance, and does not collide with the Qi output of the data hold device 32.

When data 2 is supplied to the data hold device 42 and a transmission signal C20 is supplied to the transfer control part 41, an operation is performed in a similar manner to the operation described above for the data 1.

When data 2 is inputted with a constant time difference from the data 1 after an initial state, an operation is performed in a substantially identical manner to the operation described above in FIG. 3.

According to this embodiment, as hereinabove described, even if data are asynchronously transmitted from a plurality of parallel data transmission paths at arbitrary time intervals, the arbitration control part 81 performs an arbitration in response to the transmission authorizing signal received from the output-side data transmission path 100 for authorizing data transmission up to the limit of the physical receiving ability of the transmission paths while absolutely eliminating the delay time required for arbitration control. Furthermore, packet-unit data can be sequentially transmitted to the output-side data transmission path 100 in response to the result of counting in the word number counting part 800. Thereby to an arbitration mechanism is implemented having a high-speed transmission ability with a high reliability.

Figure 8:
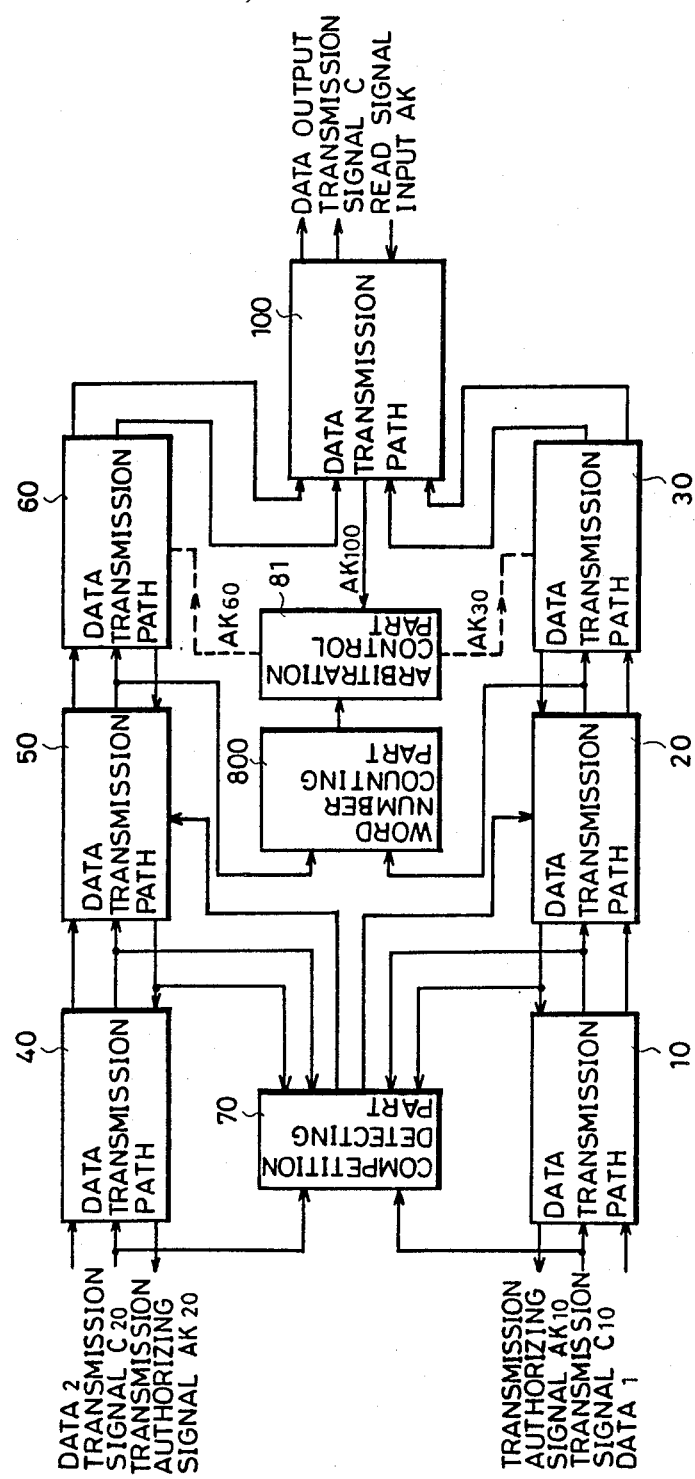
FIG. 8 is a schematic block diagram illustrating still another embodiment of the present invention, having a competition detecting part.

FIG. 8 is a schematic block diagram illustrating still another embodiment of the present invention. The structure in FIG. 8 is similar to the structure in FIG. 6, except for that a competition detecting part 70 that is provided in the structure of FIG. 8. The competition detecting part 70 is adapted to detect whether or not the difference between the times of arrival for data 1 and 2, which are inputted in data transmission paths 10 and 40 respectively, is within a constant time difference range. The competition detecting part 70 does not perform a time adjustment when the time difference is out of the constant range, while the competition detecting paint 70 temporarily stops the delayed data in the data transmission path 20 or 50 until the time difference is out of the constant range in order to perform a time adjustment when the time difference is within the constant range.

A description follows for the operation of the embodiment illustrated in FIG. 8. An arbitration control part 81 and a word number counting part 800 are similar in operation to the parts of FIG. 6, and hence only the operation of the competition detecting part 70 is described. It is assumed here that the data 2 is inputted within a slight delay to the data 1. When the head word of the data 1 arrives at a data transmission path 10, a transmission signal C10 therefor is transmitted to the data transmission path 20, and to the competition detecting part 70. When the data 2 is present in a data transmission path 40 within a constant time difference range, the competition detecting part 70 temporarily stops the data 2 in the data transmission path 50. After the data 1 passes through the data transmission path 20, the data 2 stopped in the data transmission path 50 starts to move. Thus, the competition detecting part 70 detects the degree of competition between the data 1 and 2 for temporarily stopping the data arriving with a delay in the data transmission path 20 or 50. Thereby a malfunction in the arbitration control part 81 is presented.

Figure 10:
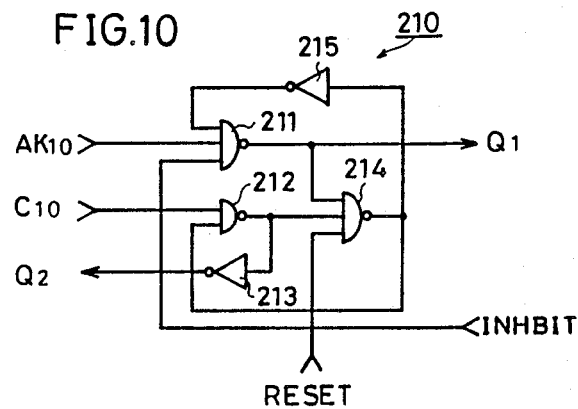
FIG. 10 is a detailed block diagram of a transfer control part illustrated in FIG. 9.
Figure 9:
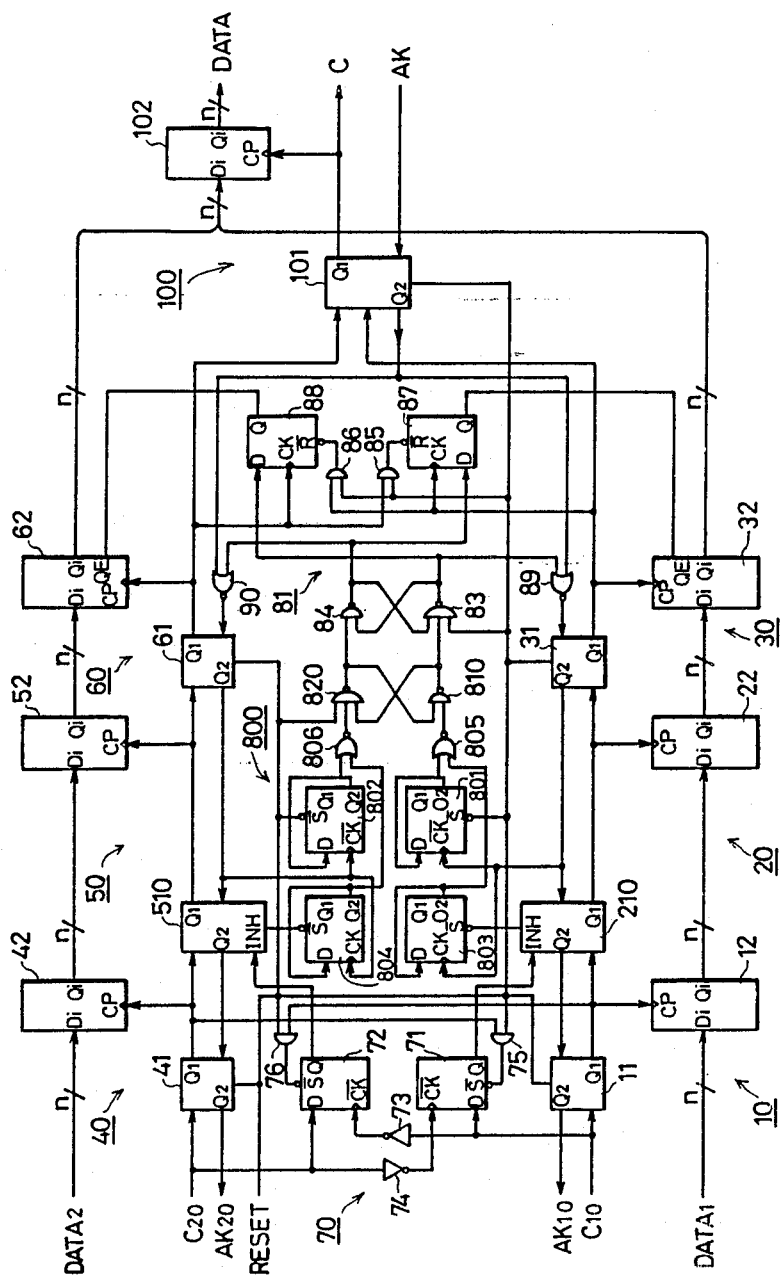
FIG. 9 is a more detailed block diagram of the embodiment illustrated in FIG. 8.

FIG. 9 is a more detailed block diagram of the data transmission unit illustrated in FIG. 8, and FIG. 10 is a detailed block diagram of a transfer control part 210 illustrated in FIG. 9.

Referring to FIG. 9, the competition detecting part 70 is formed by D-type flip-flops 71 and 72, inverters 73 and 74 and AND gate 75 and 76. The remaining structure of this embodiment is similar to the structure in FIG. 7. The D-type flip-flop 71 is adapted for inhibiting the transfer of a transmission signal C20 from a transfer control part 41 to a transfer control part 51 when the data 1 is supplied to the date hold device 12 before the data 2 is supplied to the data hold device 42. Similarly, the D-type flip-flop 72 is adapted for inhibiting the transfer of the transmission signal C10 from a transfer control part 11 to a transfer control part 21 when the data 2 is supplied to the data hold device 42 before the data 1 is supplied to the data hold device 12.

The transfer control part 210 is structured as illustrated in FIG. 10, for inhibiting the transfer of the transmission signal C10 by the Q output of the D-type flip-flop 71. This transfer control part 210 includes three-input NAND gates 211 and 214, a two-input NAND gate 212 and inverters 213 and 215. A transmission authorizing signal AK10 and the Q output of the D-type flip-flop 71, which serves as an inhibit signal, are supplied to the three-input NAND gate 211 and the transmission signal C10 is inputted to the NAND gate 212. While the $Q_2$ output is derived from the inverter 213, the $Q_1$ output is outputted from the NAND gate 211 and a reset signal is inputted to the NAND gate 214. The transfer control part 510 is structured similarly to the transfer control part 210.

With reference to FIGS. 9 and 10, the operation of the data transmission unit according to this embodiment follows. An arbitration control part 81, a word number counting part 800 and a data transmission path 100 of this embodiment are identical in operation to all these structures illustrated in FIG. 7. Hence, the following description is made mainly with reference to the operation of the competition detecting part 70. It is assumed here that the data 2 is outputted to the data transmission path 40 with a slight delay to the data 1. The data 1 is supplied to the data hold device 12 and the transmission signal C10 is supplied to the transfer control part 11 and the inverter 73. Before the transmission signal C10 is returned to a high level from a low level, the data 2 is supplied to the data hold device 42 with a slight delay to the data 1 and the transmission signal C20 is supplied to the transfer control part 41. Since the D input of the D-type flip-flop 72 is at a low level, the Q output of the D-type flip-flop 72 goes to a low level when the transmission signal C10 again returns from the low level to a high level. Thereby, the transmission signal C20 transmitted to the transfer control part 510 is not sent to the transfer control part 61 but the signals stopped by the transfer control part 510.

When the $Q_1$ output of the transfer control part 11 is transmitted to the transfer control part 210, the output of the AND gate 76 goes to a low level in response to the Qi output. Thereby, the Q output of the D-type flip-flop 72 is set and the transfer of the transmission signal C10 stopped in the transfer control part 510 is again authorized and transmitted to the transfer control part 61.

A similar operation is performed when the data 1 is outputted to the data hold device 12 with a slight delay to the data 2.

According to this embodiment, as hereinabove described, the competition detecting part 70 is so provided for stopping transmission of either transmission signal when time difference between times of arrival of the data 1 and 2 is within a constant range. Thereby, data holdup can be minimized with an arbitration.

Figure 11:
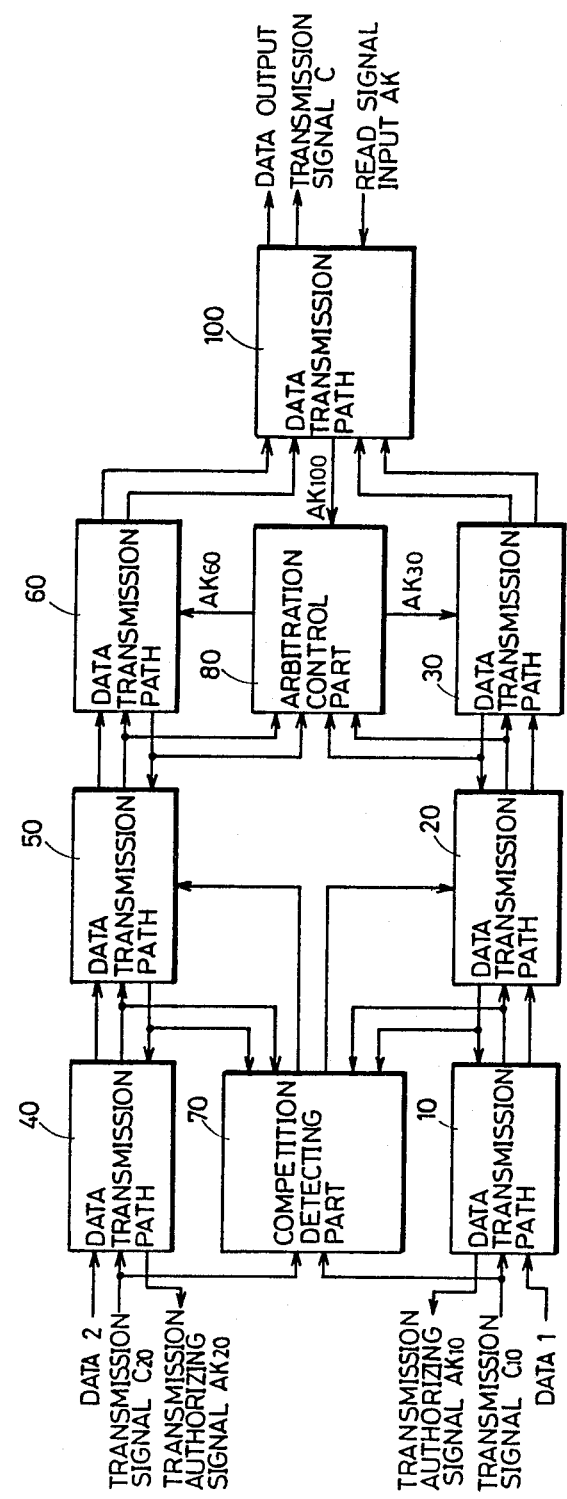
FIG. 11 is a schematic block diagram illustrating a further embodiment of the present invention, having a competition detecting part and an arbitration control part.

FIG. 11 is a schematic block diagram illustrating a further embodiment of the present invention. In the embodiment of FIG. 11, the competition detecting part 70 in FIG. 8 is added to the structure of FIG. 2. The competition detecting part 70 is adapted to detect whether or not time the difference between times of arrival of data 1 and 2 inputted in data transmission paths 10 and 40 is within a constant time difference range and a time adjustment is not performed when the difference is outside of the constant range, while temporarily stopping the data arriving with a delay in the data transmission path 20 or 50 until the time difference is out of the constant range in order to perform the time adjustment when the time difference is within the constant range.

Figure 12:
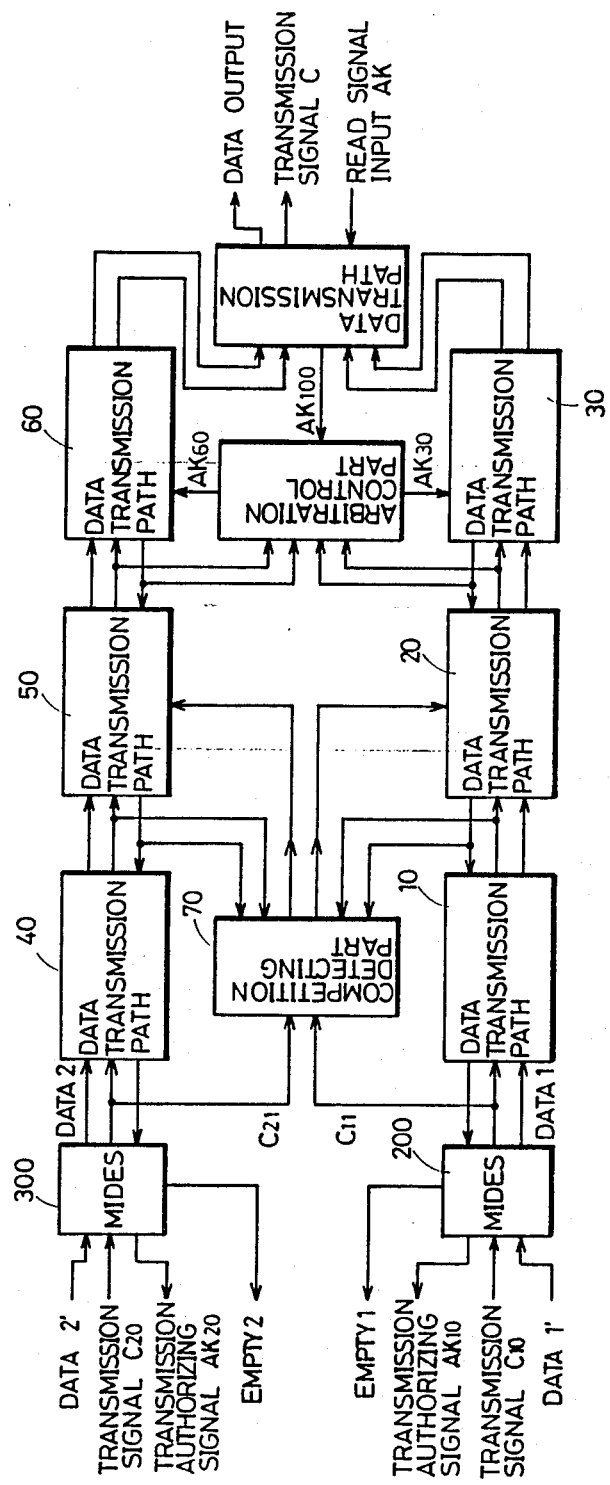
FIG. 12 is a schematic block diagram illustrating a further embodiment which is provided with MIDES.

FIG. 12 is a schematic block diagram illustrating a further embodiment of the present invention. In the embodiment of FIG. 12, minimum delay elastic store mechanisms (hereinafter referred to as MIDES) 200 and 300 are connected to input sides of data transmission paths 10 and 40 of the structure in FIG. 11. The MIDES 200 and 300 are adapted to improve the physical data receiving ability of data transmission paths 10, 20, 30, 40, 50 and 60.

Figure 13:
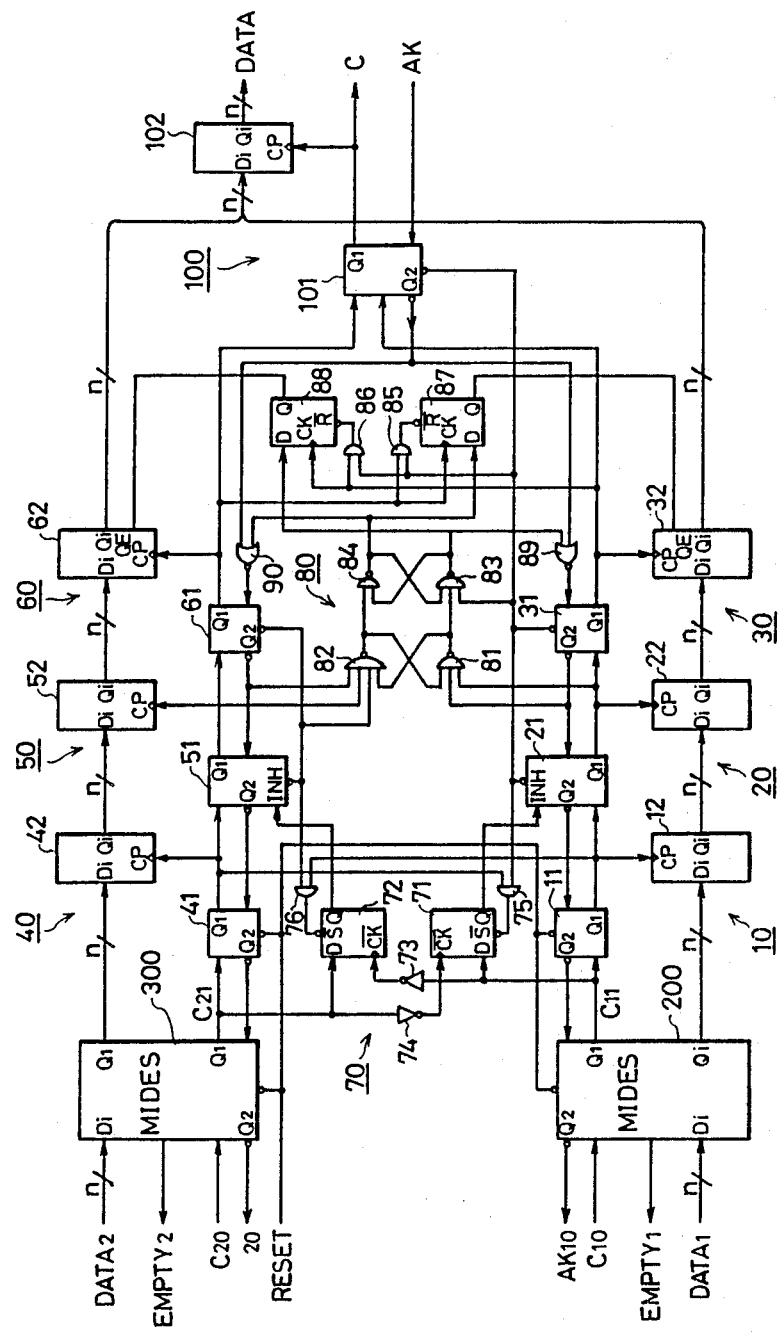
FIG. 13 is a more detailed block diagram of the embodiment illustrated in FIG. 12.
Figure 14:
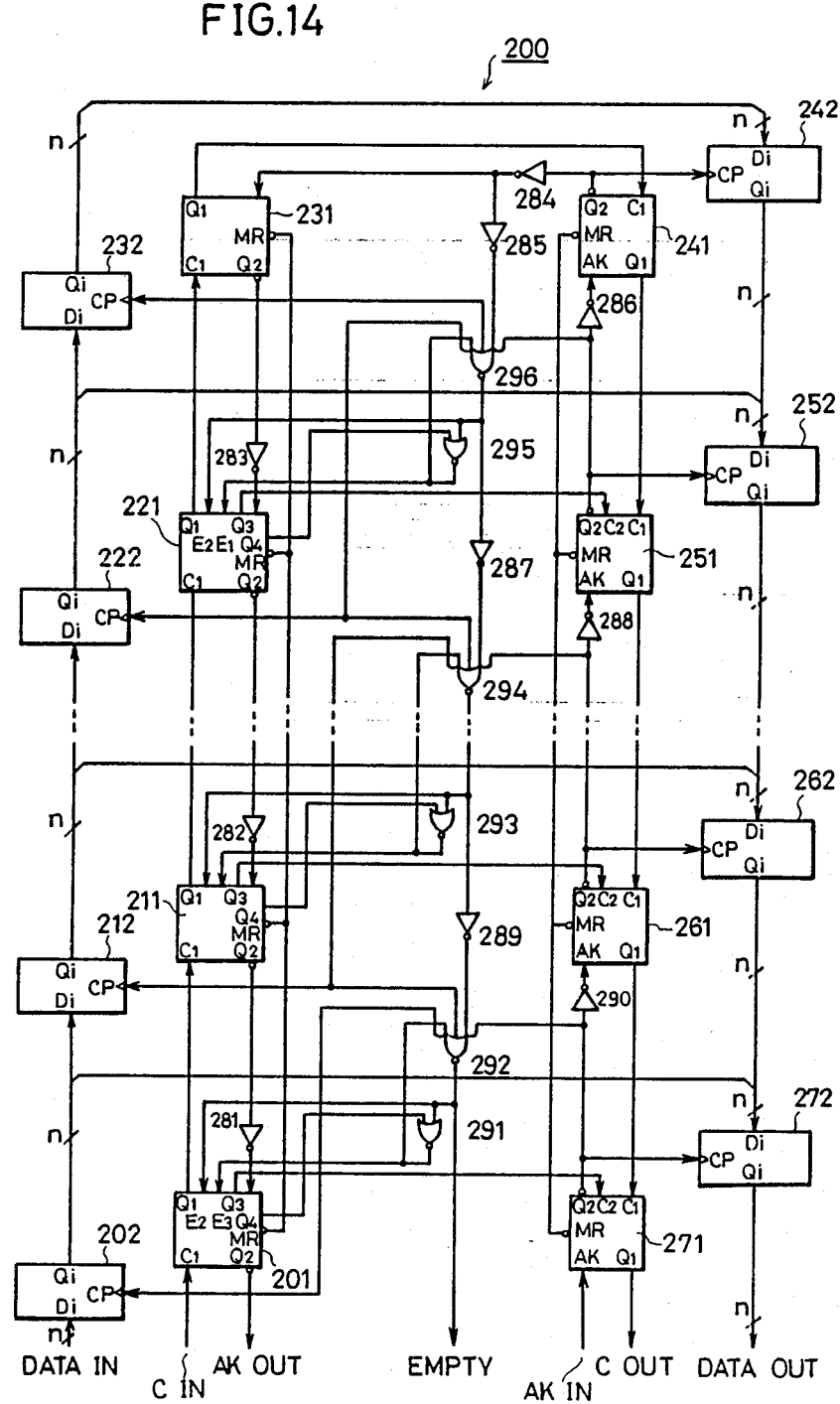
FIG. 14 is a more detailed block diagram of the MIDES illustrated in FIGS. 11 and 12.

FIG. 13 is a detailed block diagram of the embodiment in FIG. 12, and FIG. 14 is a detailed block diagram of the MIDES in FIGS. 12 and 13. A description follows for the structure of this embodiment. A competition detecting part 70 illustrated in FIG. 13 is similar to the part in FIG. 9, and an arbitration control part 80 is similar to the part in FIG. 3. The MIDES 200 is connected to input sides of a transfer control part 11 and the data hold device 12, while the MIDES 300 is connected to input sides of a transfer control part 41 and the data hold device 42.

The structure of the MIDES 200 is described as follows with reference to FIG. 14. The MIDES 200 includes transfer control parts 201, 211, 221, 231, 241, 251, 261 and 271, data hold devices 202, 212, 222, 232, 242, 252, 262, and 272, inverters 281 to 290 and NOR gates 291 to 296. The data hold devices 202, 212, 222, 232, 242, 252, 262 and 272 are connected in series with each other, while the data hold devices 202 and 272, 212 and 262, and 222 and 252 are connected with each other to define data bypass paths respectively. The transfer control parts 201, 211, 221, 231, 241, 251, 261 and 271 perform handshaking control similarly to the transfer control parts 1!, 31, 41 and 61 in FIG. 13.

The operation of the MIDES 200 is described as follows. When data is supplied to the data hold device 202 and a transfer control signal C is supplied to the transfer control part 201, the transfer control part 201 detects whether or not the transfer control parts 211 and 271 are in empty states by the outputs of the NOR gates 291 and 292. When the transfer control part 271 is busy, the transfer control part 201 transmits the transfer control signal C to the transfer control part 211, while transmitting the transfer control signal C to the output-side transfer control part 271 when the control part 271 is empty. The transfer control part 211 receiving the transfer control signal C similarly detects whether or not data are present in the transfer control parts 221 and 261 by the NOR gate 293 and the like, to for performing a similar operation as above.

Thus, the stage number of the data transmission paths can be varied with the quantity of data to prevent data overflow by deciding the entire stage number in response to the scale of the system. Signals EMPTY1 and EMPTY2 outputted from the MIDES 200 and 300 are representative of writable states of the MIDES 200 and 300. So far as the output signals indicate writable states and transmission-authorized states, input to the MIDES 200 and 300 is available.

Figure 15:
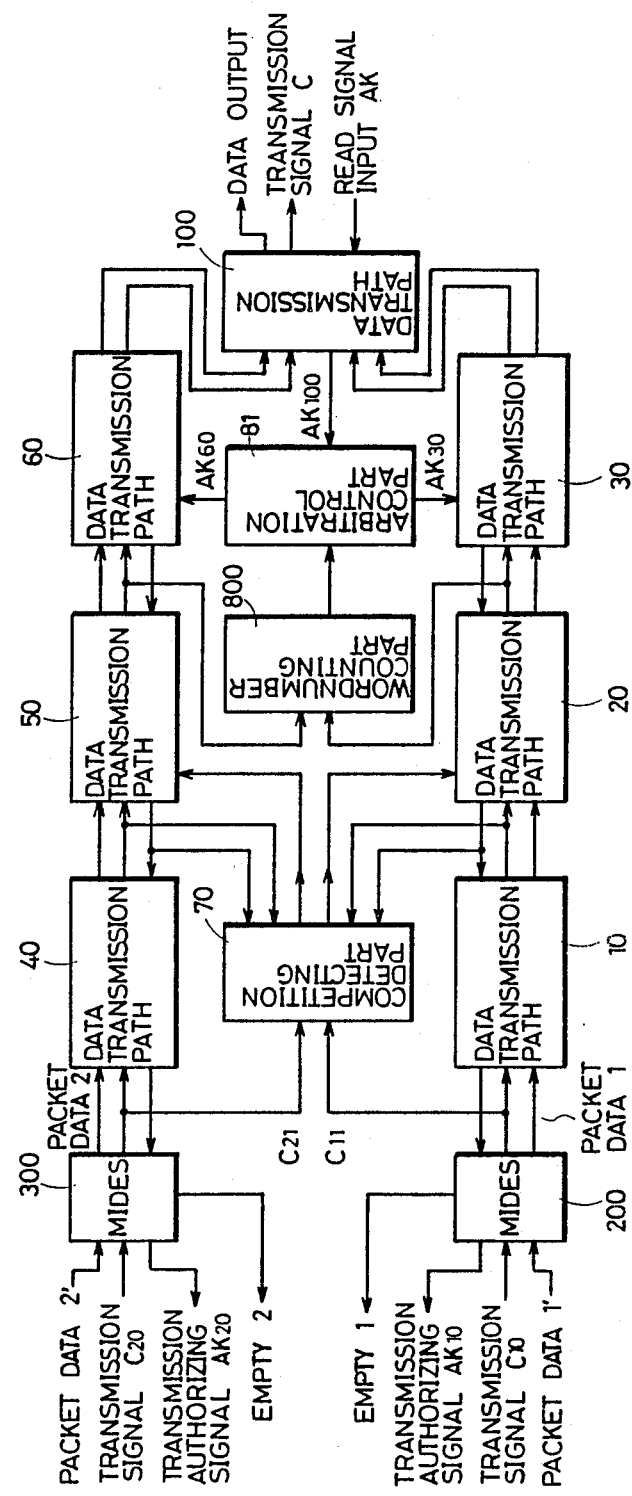
FIG. 15 is a schematic block diagram illustrating a further embodiment which is provided with MIDES, a competition detecting part, a word number counting part and an arbitration control part.

FIG. 15 is a schematic block diagram illustrating a further embodiment of the present invention. In the embodiment of FIG. 15, a word number counting part 800 is added to the structure of FIG. 12. The word number counting part 800 is identical to the part in FIG. 6.

Figure 16:
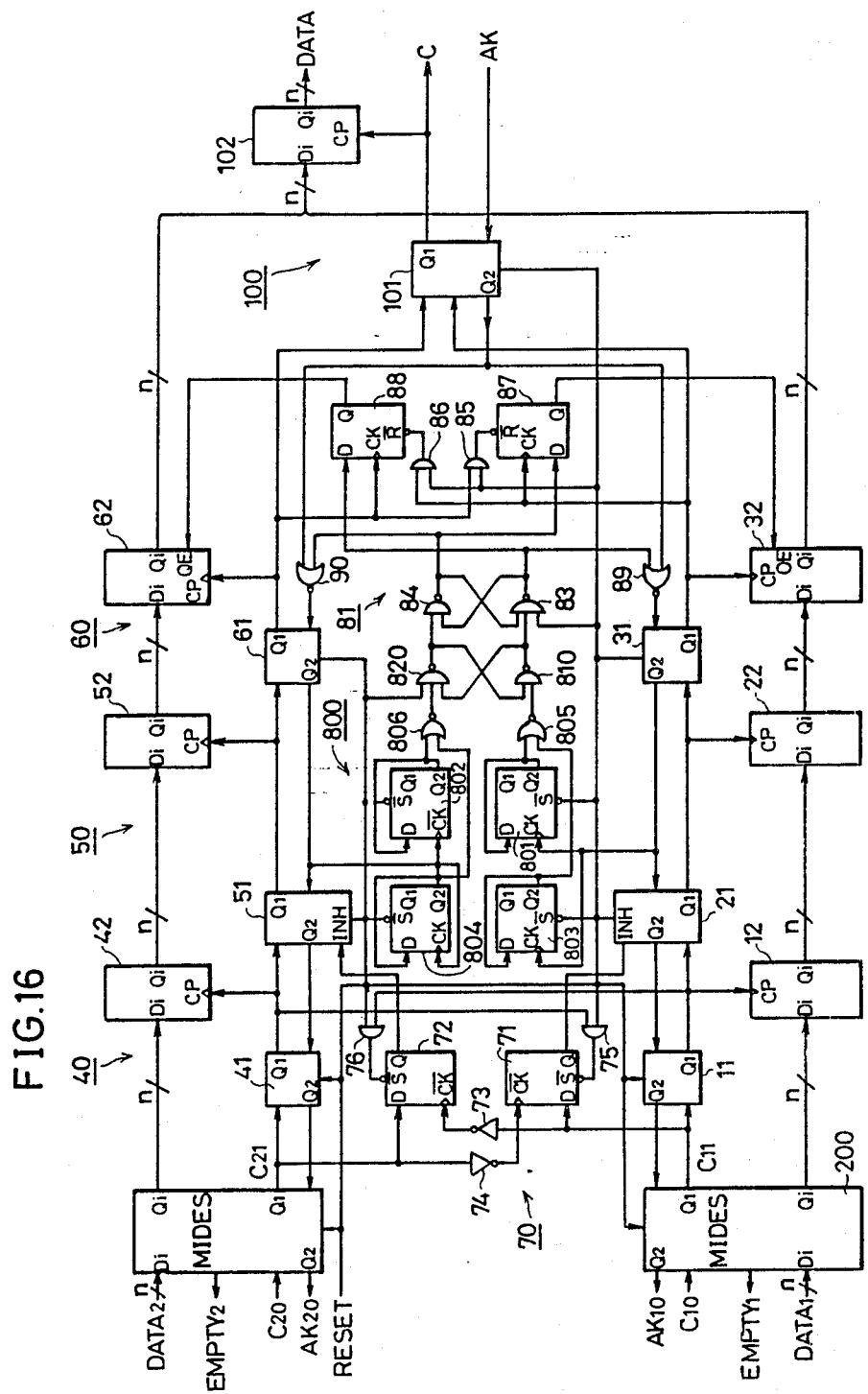
FIG. 16 is a more detailed block diagram of the embodiment illustrated in FIG. 15.

FIG. 16 is a detailed block diagram of the embodiment in FIG. 15. In the structure of FIG. 16, D-type flip-flops 801, 802, 803 and 804 and NOR gates 805 and 806 forming the word number counting part 800 are added to the structure in FIG. 13. The other structure and operation of this embodiment are identical to the structure and operation of the embodiment in FIG. 7, and hence redundant description is omitted.

According to this embodiment, as hereinabove described, when data is present only on one data transmission path group in an empty state of the output-side data transmission path 100, the data is sequentially outputted. When data are present on two input-side data transmission path groups which are provided in parallel with each other and transmitted with the maximum transmission ability of the data transmission paths, the data are temporarily stored in data transmission paths 30, 20 and 10, the MIDES 200, data transmission paths 60, 50 and 40 and MIDES 300 since the data cannot be completely processed in the data transmission path 100, while the data transmission paths 30 and 60 can alternately transmit the data from the respective transmission paths to the data transmission path 100 in response to transmission authorizing signals AK from the data transmission path 100.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data transmission unit for transmitting data from a first transmission path to a second transmission path in response to a control transmission authorizing signal supplied from the record transmission path, said data transmission unit comprising:

a first input-side transmission path for transmitting data in response to a first transmission authorizing signal;

a second input-side transmission path provided in parallel with said first input-side transmission path for transmitting data in response to a second transmission authorizing signal;

an output-side transmission path for transmitting data outputted from said first or second input-side transmission path in response to the control transmission authorizing signal from the second transmission path; and arbitration control means for determining whether data is present in said first and second input-side transmission paths and outputting said first transmission authorizing signal for said first input-side transmission path and said second transmission authorizing signal for said second input-side transmission path in response to the control transmission authorizing signal from said output-side transmission path according to a degree of data occupancy of said first and second input-side transmission paths.

2. A data data transmission unit in accordance with claim 1, wherein each of said first and second input-side transmission paths comprises:

input-side data hold means for holding inputted data; and input-side transfer control means for transferring data held in said input-side data hold means to said output-side transmission path in response to a command pulse signal for transmitting said data from the first transmission path and the control transmission authorizing signal from said arbitration control means.

3. A data transmission unit in accordance with claim 2, wherein said arbitration control means includes means for supplying the first or second transmission authorizing signal to aid input-side transfer control means in response to a command pulse signal from said first or second input-side transmission path.

4. A data transmission unit in accordance with claim 3, further comprising word number counting means for counting word numbers of data transmitted to said first and second input-side transmission paths and supplying a packet-unit pulse signal to said arbitration control means in response to data of a predetermined word number being counted;

said arbitration control means including means for outputting the control transmission authorizing signal to said first or second input-side transmission path which transmits data of said predetermined word number to said output-side transmission path in response to said packet-unit pulse signal from said word number counting means.

5. A data transmission unit in accordance with claim 3, further comprising competition detecting means for detecting whether or not data are present in said first and second input-side transmission paths respectively and whether or not a time difference between the arrival of said data is in a predetermined constant time difference range which stops data from arriving with a delay in said first or second input-side transmission path when said time difference is out of said predetermined constant time difference range.

6. A data transmission unit in accordance with claim 5, wherein said competition detecting means comprises:

a first flip-flop being set in response to said command pulse signal from the first transmission path supplied to said first input-side transmission path and said command pulse signal from the first transmission path failing to be supplied to said second input-side transmission path; and a second flip-flop being set in response to said command pulse signal from the first transmission path supplied to said second input-side transmission path and said command pulse signal from the first transmission failing to be supplied to said first input-side transmission path;

said input-side transfer control means of said first input-side transmission path includes first gate means for inhibiting said command pulse signal from being transferred in response to said second flip-flop being set;

said input-side transfer control means of said second input-side transmission path includes second gate means for inhibiting said command pulse signal from being transferred in response to said second flip-flop being set.

7. A data transmission unit in accordance with claim 3, further including buffer means connected to respective input sides of said first and second input-side transmission paths for changing a delay amount of data in response to said degree of occupancy of said data in said first and second input side transmission paths.

8. A data transmission unit in accordance with claim 7, wherein said buffer means comprises:

a plurality of data hold means connected in series with each other and a predetermined number of said data hold means being connected for bypassing data; and transfer control means provided in correspondence to respective ones of said plurality of data hold means for transferring said command pulse signal supplied from the first transmission path to one of said plurality of data hold means or transferring said command pulse signal while bypassing said predetermined number of said data hold means in response to said degree of data occupancy in said first and second input-side transmission paths.

9. A method in accordance with claim 8, wherein said step (c) comprises:

holding data transmitted from said first and second input-side transmission paths; and transferring data from said step of holding to the second transmission path in response to the control transmission authorizing signal.

10. A method in accordance with claim 8, wherein said steps (a) and (b) comprise:

holding data inputted to said first and second input-side transmission paths; and transferring data from said step of holding to said out-put side transmission path in response to a command pulse signal for transmitting data from the first transmission path and the control transmission authorizing signal.

11. A method in accordance with claim 10, further comprising the steps of:

counting word numbers of data transmitted to said first and second input-side transmission paths; and supplying a packet-unit pulse signal to said step (e) in response to data of a predetermined word number being counted so that the control transmission authorizing signal is output to said first or second input-side transmission path and data of said predetermined word number is transmitted to said output-side transmission path in response to said packet-unit pulse signal.

12. A method in accordance with claim 10, further comprising the steps of:

detecting whether or not data are present in said first and second input-side transmission paths respectively; and detecting whether or not a time difference between the arrival of said data is in a predetermined constant time difference rage for stopping data from arriving with a delay in said first or second input-side transmission path when said time difference is out of said predetermined constant time difference range.

13. A data transmission unit in accordance with claim 1, wherein said output-side transmission path comprises:

output-side data hold means for holding data transmitted from said first and second input-side transmission paths; and output-side transfer control means for transferring data held in said output-side data hold means to the second transmission path in response to the control transmission authorizing signal from the second transmission path.

14. A method for transmitting data from a first transmission path to a second transmission path in response to a control transmission authorizing signal supplied from the second transmission path, comprising the steps of:

(a) transmitting data to a first input-side transmission path in response to a first transmission authorizing signal;

(b) transmitting data to a second input-side transmission path provided in parallel with said first input-side transmission path in response to a second transmission authorizing signal;

(c) transmitting data outputted from said first and second input-side transmission paths to an output-side transmission path in response to the control transmission authorizing signal from the second transmission path;

(d) determining whether or not data is present in said first and second transmission paths; and (e) outputting said first transmission authorizing signal for said first input-side transmission path and said second transmission authorizing signal for said second input-side transmission path in response to the control transmission authorizing signal from said output-side transmission path according to a degree of data occupancy of said first and second input-side transmission paths.

* * * * *